United States Patent Office 3,076,301
Patented Feb. 5, 1963

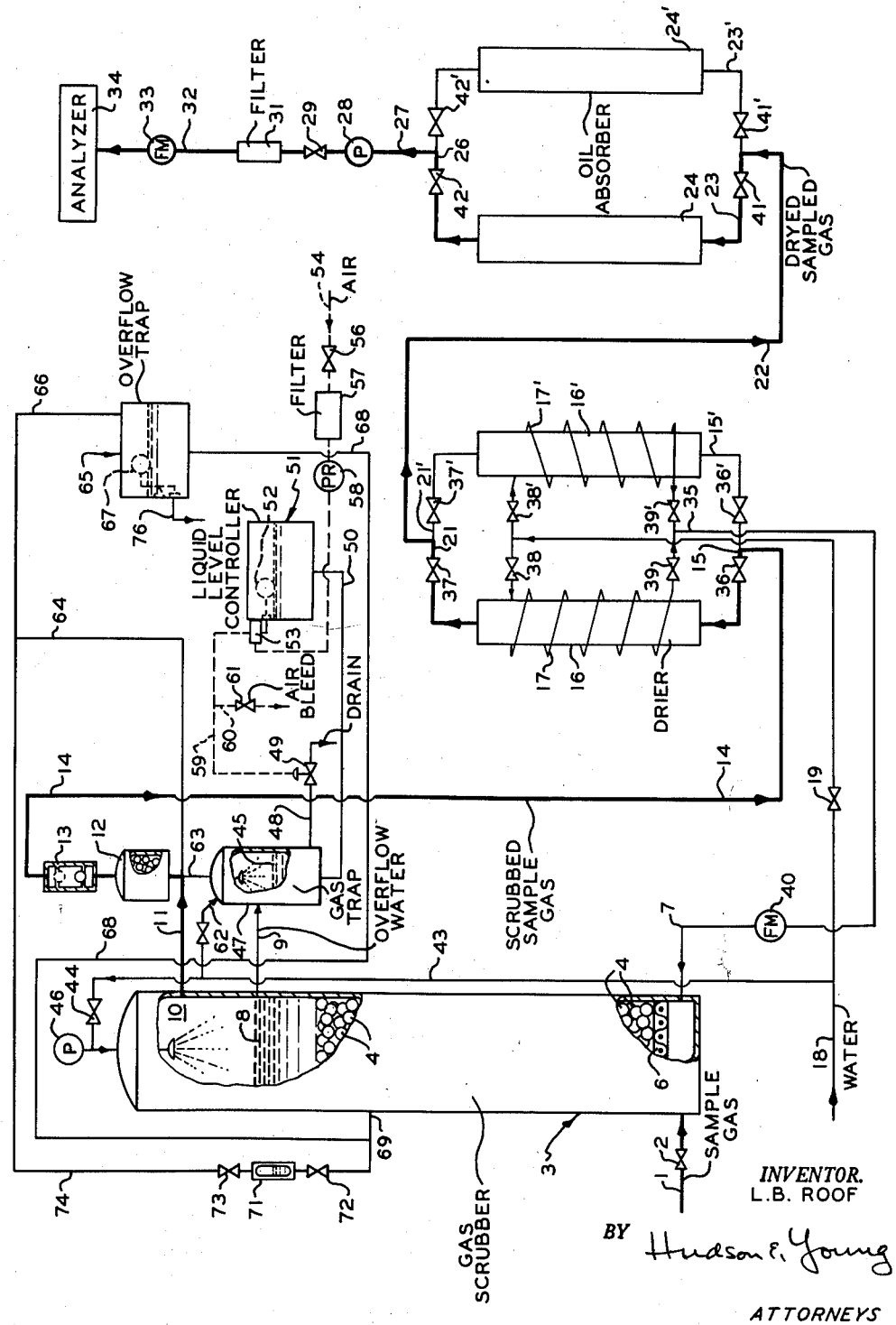

3,076,301
GAS SEPARATION SYSTEM
Lewis B. Roof, Bartlesville, Okla., assignor to Phillips Petroleum Company, a corporation of Delaware
Filed June 3, 1960, Ser. No. 33,681
6 Claims. (Cl. 55—18)

This invention relates to an instrument sampling system. In another aspect, it relates to a method and apparatus for preparing a gaseous sample stream, such as a mixture of $C_4$ and lighter hydrocarbons, for analysis by removing from said stream undesirable components such as carbon particles, catalyst dust, heavy oils, tars, and water, so as to obtain a clean, dry, continuous and representative sample for said analysis.

Process instrumentation is receiving widespread interest and application in the petroleum industry as well as other industries due to the demand for increased production and higher quality products. While a great deal of attention has been given to the development of analytical instruments, such as mass spectrometers, chromatographic analyzers, and the like, little consideration has been given to suitable sampling systems. Many of the difficulties encountered with analyzer operations may be traced to inadequate or faulty sampling systems and their failure to provide a clean, dry, continuous and representative sample stream for the instruments. Sample streams often contain undesirable components such as carbon particles, catalyst dust, heavy oils, tars, and water, albeit in small amounts, the inadequate or faulty removal of which by the instrument sampling system gives rise to inaccurate analysis and in many cases damage to the instrument itself.

Accordingly, an object of this invention is to provide an improved instrument sampling system. Another object is to provide an improved method and apparatus for preparing a gaseous sample stream, such as a mixture of $C_4$ and lighter hydrocarbons, for analysis. Another object is to provide an improved method and apparatus for removing from a gaseous sample stream undesirable components such as carbon particles, catalyst dust, heavy oils, tars, and water, so as to obtain a clean, dry, continuous and representative sample for analysis. Further objects and advantages of this invention will become apparent to those skilled in the art from the following discussion, appended claims, and accompanying drawing in which the single FIGURE diagrammatically illustrates a preferred embodiment of the instrument sampling system of this invention.

Referring now to the drawing, a sample gas stream for analysis, such as the mixture of $C_4$ and lighter hydrocarbons, is continuously passed via line 1, having a flow control valve 2 therein, to a vertical gas scrubber column 3. The latter is provided with a plurality of gas-liquid contacting means 4, such as glass or metal spheres, disposed in the lower portion of the column and resting on a screen 6 located at the bottom of the column. Scrubber liquid, such as water, oil, etc, is introduced via line 7 into the lower end of the column so as to maintain within the same a body of scrubbing liquid, the upper level of which is indicated at 8. This scrubbing liquid is continuously introduced via line 7 and withdrawn via line 9 at the upper end of the body of scrubber liquid. The gas introduced into the column travels upwardly therethrough and the scrubbed gas accumulates in the upper part 10 of the column above the level 8 of the scrubber liquid, from which locus it is continuously withdrawn via line 11. The scrubbed gas in line 11 passes upwardly through a liquid drop-out unit 12, containing a plurality of gas-liquid contact means such as glass beads where droplets of scrubber liquid are condensed and drop out into line 63. The scrubbed gas then passes through one or more float check valves 13 into line 14.

The scrubbed gas in line 14 passes via inlet line 15 to a vertical drying column 16, the latter having associated therewith a cooling coil 17 to which a cooling medium such as water is supplied via line 18, the latter having a flow control valve 19 therein. Drying column 16 can be loaded with any suitable desiccant, such as Drierite ($CaSO_4$), $CaCl_2$, $BaO_2$, $P_2O_5$, and the like. The dried and scrubbed gas flows via outlet line 21 from the drying unit into line 22.

The dried, scrubbed gas in line 22 may contain residual amounts of heavy oils and tars. In order to remove such contaminants the gas in line 22 is passed to the inlet line 23 of a vertical absorber column 24, packed with suitable absorbent where such residual contaminants are removed. Solid absorbents which can be used include silica gel, charcoal, molecular sieve, ascarite, fluorisil, alumina, and the like. The heavy oil-free gas passes from the outlet line 26 of absorber column 24 and is conveyed from this unit via line 27.

Any solid particles, such as carbon, grit, dust, and the like, which have not been removed from the sample stream by the upstream units, are removed from the gas by passing the gas via line 27, having a pressure gauge 28 and flow control valve 29 therein, to a suitable filter 31, such as a sintered stainless steel filter. The filtered gas is then passed from filter 31 via line 32, having a suitable flow meter 33 therein, to analyzer 34, which can be any analyzer known in the art for analyzing gaseous samples, such as a mass sepectrometer, chromatographic analyzer, and the like.

Referring again to the drying unit, the heat exchange liquid used to cool drying column 16 is passed from line 17 to line 35 and is then preferably passed via line 7 to the bottom of gas scrubbing column 3 where it is used in scrubbing the sample gas stream introduced into the lower end of the column. Alternatively, the used heat exchange medium can be passed to disposal and the same or different type of liquid used for scrubbing the sample gas stream in column 3.

Since for most purposes of analysis, particularly in the plant, it is often necessary to provide a continuous gas sample stream for analysis, provision is made according to another aspect of my invention for removing the spent drying column and/or absorbing column. This is also shown in the drawing where a second drying column 16′ like that of the above described drying column 16 is provided, the similar appurtenances of which are designated with primed reference numbers. A simple and conventional container filled with moisture indicating material can be disposed in line 22 for the purpose of indicating when the desiccant in the drying column becomes spent or exhausted. In order to remove the spent drying column 16 and place in operation the second drying column 16', the inlet line 15 and the outlet line 21 of drying column 16 are provided with shut-off valves 36 and 37, respectively. Similarly, the inlet and outlet of heat exchange line 17 is provided with shut-off valves 38 and 39, respectively. Likewise, the similar apparatus of the second drying column 16' are provided with like shut-off valves. Thus, when drying column 16 is in use, shut-off valves 36, 37, 38 and 39 are open, and shut-off valves 36', 37', 38' and 39' are closed. When it is desired to remove spent column 16, the positions of said valves are reversed so that the sample stream in line 14 is dried by passage through drying column 16'. When the latter becomes exhausted, it is removed from the unit and the sample stream then dried by passage through a renewed or new drying column 16 in the manner described.

Similarly, a second oil absorbing column 24' is provided and when it is desired to take out of operation the spent or exhausted oil absorber column 24, valves 41 and 42 are closed and valves 41' and 42' are opened, so as to allow the sample stream in line 22 to pass through the second oil absorbing column 24'. After the latter becomes exhausted, as indicated by a change in color or other property, the valve positions are reversed so that the sample stream may then pass through a renewed or new oil absorbing column 24.

According to another aspect of this invention, I provide means for automatically controlling the gas pressure in column 3 and means for removing scrubbing liquid therefrom without the loss of any of the scrubbed gas stream. This feature is shown in the drawing where the scrubbing liquid overflowing in line 9 from the top of the body of scrubbing liquid in column 3 is passed to a gas trap 47. A body 45 of used scrubbing liquid is allowed to accumulate in gas trap 47, and this accumulated liquid is allowed to continuously drain therefrom via line 48, having an automatic flow control valve 49 therein such as an air-operated diaphragm motor valve like that described and claimed in U.S. 2,815,037. The lower end of gas trap 47 communicates via liquid leg 50 with a liquid level controller unit 51 having a pivotal float 52 therein which automatically controls an air pilot valve 53. A supply of air is passed via line 54, having a shut-off valve 56, filter 57, and pressure regulator 58 therein, to the pilot valve 53, the latter controlling the air pressure in line 59 to the motor valve 49 in drain line 48. Air line 59 is preferably provided with an air bleed line 60 having a bleed valve 61 therein.

In a further aspect of this invention, means are provided for insuring the removal of heavy oils and the like from the sample stream. Referring again to the drawing, line 43 communicates with scrubbing liquid supply line 18 to enable a small amount of said liquid to be passed via line 43, having shut-off valve 44 and a pressure gauge 46 therein, to the upper end of the scrubbing column 43 wherein it is sprayed into the gas accumulating region 10. I also can pass a small amount of said scrubbing liquid from line 43 via a valved line 62 into the upper end of gas trap 47. These sprays help to provide additional gas-liquid contact for increased scrubbing, and extend the useful life of the absorbent column.

In order to be able to visually observe the liquid level of the scrubbing liquid in column 3, I can provide a sight-glass 71 which communicates at its lower end via line 69, having shut-off valve 72 therein, with the body of liquid within column 3, and communicates via line 74, having a shut-off valve 73 therein, and lines 64, 11 with gas region 10. Liquid line 69 also communicates via line 68 with an overflow trap 65 having a pivotal float 67 therein. The upper end of overflow trap 65 also communicates via lines 66, 64 and 11 with the upper end 10 of column 3. Overflow trap 65 is also provided with a drain line 76.

In operation, the sample gas stream is continuously introduced via line 1 into the lower end of the gas scrubber column 3, together with scrubbing liquid continuously introduced via line 7. The gas flows upwardly in the column of scrubbing liquid contained in the column, and in so doing contacts the gas-liquid contact means 4 immersed within the body of scrubbing liquid. In this manner the gas is cooled and certain heavy oils present as undesirable components in the gas stream condense and are absorbed. Some of these heavy oils and tars accumulate at the top of the body of liquid adjacent level 8, but since the upper level of the gas-liquid contact means 4 are disposed below this level, this layer of heavy oils and tars does not contact the gas-liquid means. The scrubbed gas is continuously withdrawn from the gas accumulating space 10 via line 11 and is passed upwardly through drop-out unit 12, wherein residual droplets of suitable liquid are condensed on the surface of the gas-liquid contact means within this unit. This condensed liquid falls via line 63 into the gas trap 47. The scrubbed gas then passes through valve 13 and is passed via line 14 to the inlet line 15 of drying column 16. Water or other heat exchange liquid is passed via line 18 and circulated within line 17 to keep the drying column 16 cooled, the used heat exchange liquid passing from line 17 into line 35 and thence to disposal, or via line 7 into the lower end of gas scrubbing column 3. The scrubbed gas in passing upwardly through the desiccant in drying column 16 is dried and further cooled. The dried gas is then passed from line 21 into line 22, and thence via line 23 into absorber column 24. In the latter column, residual amounts of the undesirable heavy oil components in the gas stream are absorbed on contact with the silica gel or other absorbent contained within this unit. The cleaned gas is then passed via line 27 into filter unit 31, where solid particles, such as carbon, catalyst dust, and the like, are removed. The filtered gas is then passed via line 32 to analyzer 34 for analysis.

Referring again to the gas scrubbing column 3, the overflow scrubbing liquid in line 9 passes into gas trap 47, accumulating a certain head of liquid therein. Any heavy oils or tar in this stream accumulate as an upper layer in the body of liquid contained within gas trap 47. This accumulated liquid within gas trap 47 is drained via line 48, the rate of drainage being determined by the position of the motor valve 49. Should the level of liquid within column 3 fall below the inlet of overflow line 9, the liquid accumulating within gas trap 47 will drain. If the liquid in gas trap 47 completely drains, float 52 in liquid level controller 51 will fall and pilot valve 53 will close; as a result, the lack of air pressure supplied via line 59 to motor valve 49 will cause the latter to close and prevent loss of gas from gas accumulating region 10 through gas trap 47 and drain line 48. On the other hand, if the level of liquid within column 3 rises above the inlet of overflow line 9, the level of liquid within gas trap 47 will also rise, causing float 52 to rise and open to a greater degree pilot valve 53. This will increase the air pressure supplied via line 59 to motor valve 49, increasing the opening thereof; as a result, liquid will be withdrawn from gas trap 47 at a faster rate so as to cause a level of liquid in scrubbing column 3 to fall back to its normal level. In the event that liquid within column 3 rises to such an extent that some of it flows into the gas withdrawal line 11, this liquid will fall back via line 63 into gas trap 47 and the flow of liquid into line 14 will be prevented by check valve 13, the ball thereof being illustrated by a broken line when such occurs.

As mentioned hereinbefore, although it is believed that the gas trap system will be sufficient to maintain the pressure in the scrubbing column without loss of gas, additional safety means have been provided should the gas trap malfunction and the level of liquid within scrubbing column 3 rise above the desired level. This is accomplished by overflow trap 65. Assuming that the gas trap system is inoperative and the level of liquid within column 3 rises above the desired level, float 67 will rise and further open the inlet of drain line 76, thereby allowing drainage of liquid from column 3.

The following example further illustrates the objects and advantages of this invention, but it should be understood that the subject invention is not to be unduly limited to that set forth in this example for illustrative purposes.

EXAMPLE

A gaseous sample stream is withdrawn from the effluent line of a thermal cracking furnace wherein a propane stream is being cracked to produce ethylene, this sample stream when it enters scrubbing column 3 having a temperature in the range of 300° to 400° F. This sample stream comprises approximately 50% water vapor and 50% hydrocarbons. The compositions of the hydrocarbons are set forth in Table I.

Table I

| Component: | Mol percent |
|---|---|
| Hydrogen | 8.9 |
| Methane | 37.2 |
| Ethane | 6.2 |
| Ethylene | 28.5 |
| Acetylene | 0.4 |
| Propane | 0.5 |
| Propylene | 10.7 |
| Butadiene | 0.8 |
| Butylenes | 1.1 |
| iso-Butane | 0.2 |
| n-Butane | 1.8 |
| $C_5$ and heavier: | |
| Pentane | 0.011 |
| Pentene | 0.205 |
| Pentadiene | 0.284 |
| Cyclopentene | 0.122 |
| Cyclopentadiene | 0.010 |
| $C_6$ unsaturates | 0.177 |
| $C_7$ unsaturates | 0.038 |
| Benzene | 1.478 |
| Toluene | 0.462 |
| $C_8$ unsaturates | 0.018 |
| Ethylene benzene | 0.021 |
| Xylene | 0.045 |
| Styrene | 0.087 |
| Methyl styrene | 0.066 |
| $C_9$ aromatics | 0.007 |
| Dicyclopentadiene | 0.145 |
| $C_{10}$ aromatics | 0.006 |
| High boiling hydrocarbons | 0.416 |
| Carbon and tars | 0.005 |
| Total | 99.7 |

The above sample gas stream is introduced into the bottom of a gas scrubbing column containing two feet of water at a rate of 300 cc./min. Water is introduced as scrubbing liquid into the column at a temperature of from 50° to 70° F. and at a rate of about 500 cc./min. and passed to a drying column containing Drierite, and thence to a silica gel absorbing column, these units decreasing the water content of the gas sample stream to about 50 to 100 parts per million, and removing all of the heavy oils and tar content. The gas is then passed through a sintered stainless steel filter wherein any residual solids present in the gas stream are removed. The gas stream is then passed to a chromatographic analyzer where it is continuously analyzed.

Various modifications and alterations of this invention will become apparent to those skilled in the art from the foregoing discussion, example, and accompanying drawing, and it should be understood that this invention is not to be unduly limited thereto.

I claim:

1. An instrument sampling system comprising, in combination, a vertical gas scrubbing column containing a body of scrubbing liquid with a plurality of gas-liquid contact means immersed therein and a gas accumulating zone thereabove, means to introduce a gas sample stream into the lower end of said scrubbing column, means for introducing said scrubbing liquid into the lower end of said scrubbing column, means for withdrawing scrubbed gas from said gas accumulating zone of said scrubbing column, liquid drop-out and check valve means in said gas withdrawal means, a vertical drying column connected to said gas withdrawal means and containing a body of desiccant, cooling means associated with said drying column, means for withdrawing cooled gas from said drying column, a vertical oil absorbing column connected to said cooled gas withdrawal means and containing a body of oil absorbent, means to withdraw gas from said absorbing column, filter means within said last-mentioned gas withdrawal means, means to pass filtered gas from said filtering means to a gas analyzing instrument, means to withdraw said scrubbing liquid from the upper end of said body of scrubbing liquid and pass said withdrawn scrubbing liquid to drainage, gas-trap means within said scrubbing liquid withdrawal means, drainage valve means in said scrubbing liquid withdrawal means downstream of said gas-trap means, liquid level control means operatively connected to said gas-trap means and having a float-controlled air pilot valve associated therewith, air supply means connected to said pilot valve, and air supply means connected to said pilot valve and said drainage valve means.

2. An instrument sampling system according to claim 1, further comprising means to supply said cooling means of said drying column with a liquid cooling medium and then pass the same to said means for introducing scrubbing liquid into said scrubbing column.

3. An instrument sampling system according to claim 2, further comprising an overflow trap having a float-operated drainage valve therein, means connecting said overflow trap to the body of scrubbing liquid within said scrubbing column, and means communicating the upper end of said overflow trap with said gas accumulating region of said scrubbing column.

4. An instrument sampling system comprising, in combination, a gas scrubbing column, means to supply a gas sample stream to the lower end of said column, means to supply a scrubbing liquid to the lower end of said column to maintain a body of scrubbing liquid therein with a gas accumulating zone thereabove, means to withdraw scrubbed gas from said gas accumulating region, means communicating with said gas withdrawal means to dry said withdrawn scrubbed gas and remove oils therefrom, means to withdraw liquid from the upper end of said body of scrubbing liquid and pass said withdrawn liquid to drainage, gas-trap means within said scrubbing liquid withdrawal means, drainage valve means in said scrubbing liquid withdrawal means downstream of said gas-trap means, liquid level control means operatively connected to said gas-trap means and having a float-controlled air pilot valve associated therewith, air supply means connected to said pilot valve, and air supply means connected to said pilot valve and said drainage valve means.

5. A method for preparing a gas sample stream for analysis, comprising the steps of passing said gas sample stream into the lower end of a continuously replenished body of scrubbing liquid, accumulating the scrubbed gas passed upwardly through said body of scrubbing liquid, contacting said accumulated gas successively with a column of desiccant and a column of oil absorbent material, filtering said gas, passing said filtered gas to an instrument for analysis thereof, withdrawing said scrubbing liquid from the upper end of said body of scrubbing liquid and passing the same to drainage, and controlling the rate of said scrubbing liquid drainage to maintain a desired level of said body of scrubbing liquid and prevent the loss of said accumulated scrubbed gas with said scrubbing liquid passed to drainage.

6. A method for preparing a gas sample stream for analysis, comprising the steps of passing said gas sample stream into the lower end of a continuously replenished body of scrubbing liquid, accumulating the scrubbed gas passed upwardly through said body of scrubbing liquid, contacting said accumulated gas with desiccant and oil absorbent material, passing said gas to an instrument for analysis thereof, withdrawing said scrubbing liquid from the upper end of said body of scrubbing liquid and passing the same to drainage, controlling the rate of said scrubbing liquid drainage to maintain a desired level of said body of scrubbing liquid and prevent the loss of said accumulated scrubbed gas with said scrubbing liquid passed to drainage and withdrawing said body of scrubbing liquid at a point below said desired level and passing the same to drainage when the level of said body of scrubbing liquid rises above said desired level and said step of controlling is ineffective in maintaining said desired level.

References Cited in the file of this patent

UNITED STATES PATENTS

| | | |
|---|---|---|
| 2,187,708 | Cibulka et al. | Jan. 16, 1940 |
| 2,493,981 | Latchum | Jan. 10, 1950 |
| 2,555,452 | McIntyre | June 5, 1951 |
| 2,664,170 | Walker et al. | Dec. 29, 1953 |
| 2,715,945 | Hankison et al. | Aug. 23, 1955 |
| 2,827,125 | Hall et al. | Mar. 18, 1958 |
| 2,853,149 | Gosselin | Sept. 23, 1958 |